July 9, 1935.  R. R. HAUGH  2,007,196
EGG GRADING
Filed Aug. 1, 1933
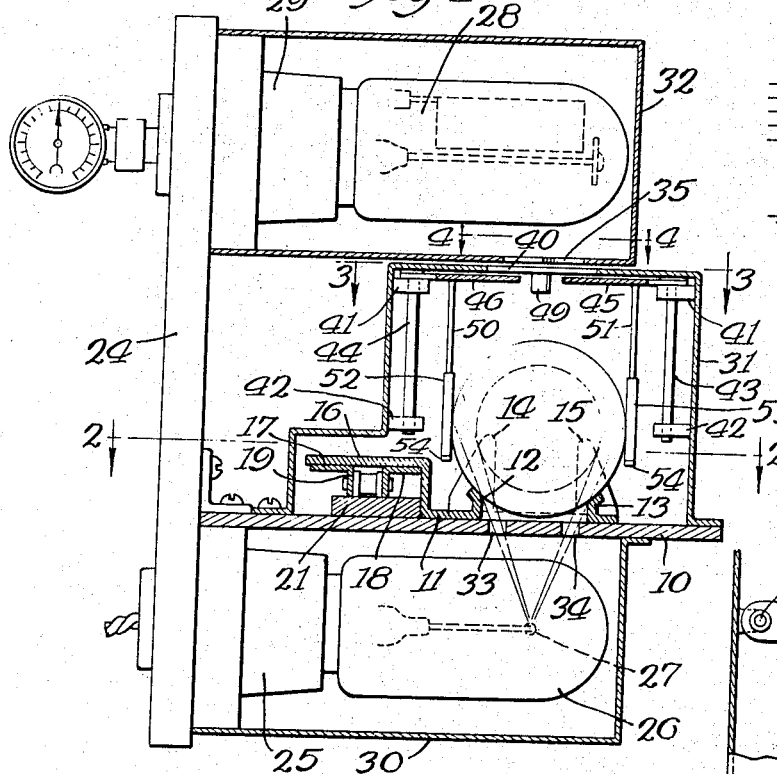
Fig. 1
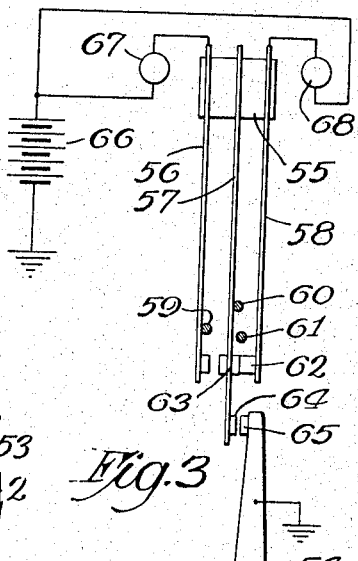
Fig. 3
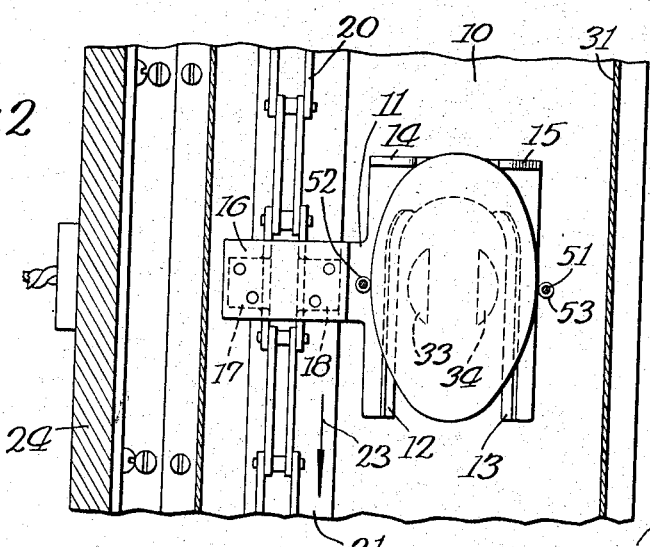
Fig. 2
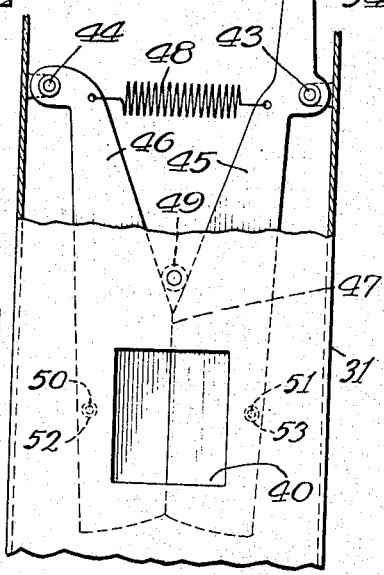
Fig. 4
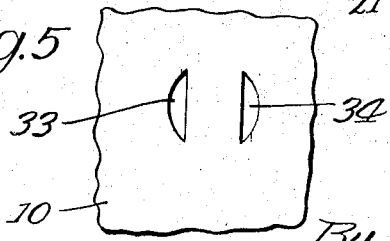
Fig. 5
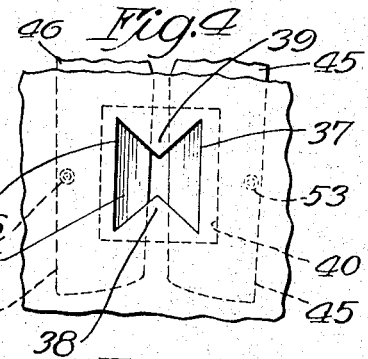
Inventor:
Raymond R. Haugh
By Fisher, Clapp, Soans & Pond, Attys.

Patented July 9, 1935

2,007,196

UNITED STATES PATENT OFFICE 2,007,196

EGG GRADING

Raymond R. Haugh, Chicago, Ill., assignor, by mesne assignments, to Kraft Egg Machine Company, Chicago, Ill., a corporation of Delaware Application August 1, 1933, Serial No. 683,161

15 Claims. (Cl. 99—6)

The invention relates to apparatus and processes for grading eggs and the principal purpose of the invention is to enable a relatively unskilled operator to determine the age, grade, size, weight and other data by which the grade or quality of the egg is ordinarily measured or determined. The apparatus as particularly set forth and described herein is in certain of its aspects a development or improvement upon the apparatus and process set forth in my co-pending application, Serial No. 676,774, filed June 21, 1933. Other features of my invention as set forth herein may be considered independent of the subject matter of said prior application.

In its preferred embodiment as herein disclosed, the invention is shown as applied to a continuous or progressive egg-testing machine. In the drawing illustrating the said embodiment:—

Fig. 1 is a vertical section through the principal part of the apparatus.

Fig. 2 is a section taken on the line 2—2 of Fig. 1.

Fig. 3 is a section taken on the line 3—3 of Fig. 1.

Fig. 4 is a section taken on the line 4—4 of Fig. 1, with a small egg in position; and Fig. 5 is an underside view of an opening in the horizontal platform or table through which the light is projected upon the egg.

Referring to the drawing, 10 is a table or platform extending horizontally in the direction of movement of the eggs, and upon which plate various parts of the functioning mechanism are mounted. The upper surface of said plate 10 constitutes a bearing support and guideway upon which support slides a series of egg supports each designated as a whole 11. Each of said egg supports is in the form of a sheet metal structure, the egg supporting part of which is U-shaped in plan and is provided with a pair of opposed parallel bars or flanges 12 and 13 suitably inclined to act, in effect, together as a V-block on which the egg rests. At the end of the bars or supports 12 and 13 where they are connected together, the sheet metal egg support 11 is provided with a pair of upstanding spaced abutments 14 and 15 which limit the rearward movement of the egg in the guides 12 and 13 and, in effect, serve to move the egg forwardly as a unit with its support.

The egg support, as shown in Figs. 1 and 2, is made with a Z-shaped extension 16 secured as by riveting to a pair of horizontally extending wings 17 and 18 projecting outwardly from a chain link 19. Said chain link 19 is part of a continuous chain 20 which, by means of suitable mechanism, not shown, is caused to move in a straight line on the supporting shelf or ledge 21 in the direction of the arrow 23.

A standard or bracket 24, suitably secured rigidly to one side or edge of the main plate 10, extends above and below said plate. Its lower extension serves to support a lamp socket 25 in which is mounted a suitable electric lamp 26 having a concentrated or condensed filament 27 located centrally beneath the center of the line of travel of the egg supports 11, and also positioned at the correct point in the said travel so as to cooperate with the photoelectric target above the egg. Said photo-electric targent comprises a suitable photo-electric cell 28 positioned in a socket 29 secured to the upper extension of the bracket 24. Suitable shields or guards are employed to prevent external or stray lights from interfering with the operation of the device. Such guards comprise a casing 30 which encloses the lower lamp 26, a casing 31 which encloses the egg supporting and propelling arrangements, and a casing 32 which encloses the photo-electric cell 28.

Light is admitted to the under surface of the egg by a pair of chord-like openings 33 and 34 in the supporting plate 10, the metal between said openings 33 and 34 serving to limit the light projected upon the egg to beams which, if extended, would be substantially contained within the concentric space between the yolk and the shell of the egg, as indicated in Fig. 1.

The light which is received from the egg by the photo-electric cell 28 is also limited, controlled and directed by the fixed opening 35 in the lower wall of casing 32. Said opening 35, as shown in Fig. 4, has a pair of parallel walls 36 and 37 extending in the direction of egg travel, the ends of the said opening being in the form of triangular or V-shaped, internally extending projections 38 and 39. Beneath said opening 35 there is a larger opening, as indicated at 40 in Figs. 1 and 3.

It has been found that the ratio of yolk diameter to egg diameter remains very constant, regardless of the size of the egg. As explained in my previous application, the vertical position of the egg yolk in reference to the center of the egg is used as a guide to determine the quality or freshness of the egg. Said prior application also describes the manner in which the rise of the yolk above the center line of the egg would serve to block off said amount of light which otherwise would be received by the target of the photoelectric cell if the egg were fresh with its yolk centrally of the egg. This is the method as disclosed in said application for determining the freshness of the egg. However, although said method is very successful in testing eggs of substantially the same dimensions, it has been found that if the egg is very large its yolk is correspondingly large, and there is thus a diminution in the amount of light transmitted by a large fresh egg as compared with the amount of light transmitted with a small fresh egg. The apparatus now to be described is effective to compensate for the variation in the size of eggs.

By referring to Figs. 1 and 3, it will be observed that at opposite sides of, and within the casing 31, there are positioned pairs of spaced upper and lower brackets 41 and 42 which serve as bearings for a pair of vertical shafts 43 and 44. To the ends of said bearing shafts 43 and 44, there are secured thin, horizontally extending plates 45 and 46 which extend from the pivots 43 and 44 towards and over the egg support, where they normally come together at the line 47 located centrally of the egg and above and parallel with the line of its travel. Said plates or shutter parts 45 and 46 are normally drawn together so as to be in contact with each other, as shown in Fig. 4, by means of a coil spring 48 located rather close to the line between pivots 43 and 44, so that a very slight force or pressure is needed to spread the shutter parts 45 and 46 apart. The line of contact 47 is maintained centrally by means of a small pin or cylindrical stop member 49.

As shown best in Figs. 1 and 4, the shutter parts 45 and 46 are equipped respectively with small, downwardly and vertically extending pins 50 and 51, the lower ends of which serve as journals for small rollers 52 and 53 respectively. The ends of the shafts or rods 50 and 51 are suitably headed over as shown at 54, in order to prevent the rollers 52 and 53 from falling off the ends of their respective shafts.

It will be observed that the space between the rollers 52 and 53, when the shutter parts are in closed position as shown in Fig. 3, is substantially less than the diameter of any ordinary egg and therefore when the egg is moved or propelled into the proper position for testing its quality, as indicated in Figs. 1 and 2, the rollers 52 and 53 must necessarily be forced apart. This serves to open the shutters 45 and 46, as indicated in Fig. 4, so as to admit the proper amount of light which is found to be necessary to test an egg of that particular diameter. The purpose of the V-shaped internal projections 38 and 39 of the light aperture 35, is to effect a relative increase in the amount of light over and above the increase which would result from the mere increase in the spacing of the shutters, and vice versa.

In addition to the freshness of the egg, it is also of some importance to be able to determine quickly the weight or size of the eggs, in view of the fact that some States have definite requirements or standards of weight. In the present apparatus this is effected by the electrical mechanism shown at the upper part of Fig. 3. As shown therein, the shutter 45 is equipped with an integral tail or rear extension 54, the end of which serves as part of an electric switch. Said electric switch also includes a suitable support 55 for a set of contact springs 56, 57, and 58. Spring 56 normally bears against a fixed stop 59, spring 57 normally bears against a fixed stop 60, while the fixed stop 61 is normally spaced a substantial distance from the side of the spring 58. The position of the spring 58 is determined by the fact that the contact 62 of said spring normally bears against one side of a duplex contact 63 on said previously described spring 57. Said tongue or spring 57 on its extended end is provided with another contact 64 which is normally spaced a slight distance from a cooperating contact 65 on the end of the tail-piece 54. Said tail-piece 54 is connected to the ground, i. e. some part of the metallic frame of the structure. A battery 66 is similarly grounded and the ungrounded terminal of the battery 66 is connected to the ends of the springs 56 and 58 by branch lines in which there are respectively included signal lamps 67 and 68. Signal lamp 67 is preferably of a color different from the color of the signal lamp 68. The operation of this electric indicating arrangement is as follows: Small eggs have a sufficient diameter so that the shutters 45 and 46 will be spread apart a distance sufficient to close the contact between 64 and 65. This serves to energize the signal lamp 68 and informs the operator that a small egg is in the apparatus at the test point. When a larger or normal sized egg is in position, the shutter members are spaced farther apart and the spring 57 is forced to the left a sufficient distance to connect its contact 63 with the corresponding contact on the spring 56. Meanwhile the spring 58 follows spring 57 and maintains contact between said springs. Hence, both of the lamps 67 and 68 will be energized when a medium size egg is being tested. However, when a still larger or "oversize" egg passes through the apparatus, the spring 63 is moved over still further to the left until the fixed stop 61 arrests the following movement of spring 58 and thus breaks the contact between said spring 57 and spring 58, putting out the lamp 68.

I claim as my invention:

1. In apparatus for testing egg quality, the combination of a support for an egg, photo-electric means for measuring the capacity of the egg to transmit light, and adjustable means controlled by the size of the egg for controlling the effect of said photo-electric means.

2. In apparatus for testing egg quality, the combination of a support for an egg, photo-electric means for measuring the capacity of the egg to transmit light, and means mechanically actuated by the egg for controlling the effect of said photo-electric means.

3. In apparatus for testing the quality of eggs, the combination of photo-electric means for measuring the capacity of the egg to transmit light and adjustable means controlled by the size of the egg for varying the amount of light transmitted to said photo-electric means.

4. In an electric egg-candling machine, the combination of photo-electric means for measuring the capacity of the egg to transmit light and shutter mechanism controlled by the size of the egg for controlling the amount of light transmitted to said photo-electric means.

5. In an electric egg-candling apparatus, the combination of a support for an egg, photo-electric means for measuring the capacity of the egg to transmit light, and a shutter mechanically actuated by the egg itself on said support for regulating the amount of light transmitted to said photo-electric means.

6. In an electric egg-candling machine, the combination of photo-electric means for measuring the capacity of the egg to transmit light, an adjustable member arranged to engage the egg while its light-transmitting capacity is being measured, and means controlled by the position of said member for controlling the effect of said photo-electric means.

7. In an electric egg-candling machine, the combination of photo-electric means for measuring the capacity of the egg to transmit light, a member arranged to engage the egg while its light-transmitting capacity is being measured, and shutter means actuated by said member for regulating the amount of light transmitted to said photo-electric means.

8. In combination with a photo-electric device for grading eggs, comprising an egg support, a light source, and a photo-electric indicating device, a shutter for varying the amount of the transmitted light according to the size of the egg being tested, and means actuated by said shutter for giving a variety of signals indicating different egg sizes.

9. In combination with means for supporting an object to be tested, a light source, photo-electric means for indicating the light-transmissibility of said object, and light-proof walls enclosing said parts, a shutter controlled by the size of said object for varying the amount of light projected on said photo-electric means, and means for increasing the positive or negative variation in transmitted light beyond an amount proportional to a variation in the opening of said shutter.

10. In combination with means for supporting an object to be tested, a light source, photo-electric means for indicating the light-transmissibility of said object, and light-proof walls enclosing said parts, a pair of shutters controlled by the size of said object for varying the amount of light projected on said photo-electric means, said shutters having a pair of opposed substantially straight edges, and a diaphragm having a pair of opposed edges extending substantially transversely of the edges of said shutters and deviating from straight lines in such a manner that a positive or negative variation in the amount of light passing between said shutters will be increased by said diaphragm beyond a quantity proportional to an increase or decrease in the opening between said shutters.

11. In combination with means for supporting an object to be tested, a light source, photo-electric means for indicating the light-transmissibility of said object, and light-proof walls enclosing said parts, a pair of shutters controlled by the size of said object for varying the amount of light projected on said photo-electric means, said shutters having a pair of opposed substantially straight edges, and a diaphragm having a pair of V-shaped projections extending from opposite sides thereof toward the center of the opening defined by said diaphragm, the vertices of said V's lying in a line substantially parallel to the edges of said shutters.

12. In an electric egg-candling apparatus, the combination of a support for an egg, photo-electric means for measuring the light-transmitting capacity of an egg, a shutter comprising a pair of pivoted plates vertically spaced from said support, an actuating member secured to each of said plates and extending toward said support whereby said members will normally be contacted by an egg seated on said support, so that said shutter may be opened to an extent varying in accordance with the size of the egg.

13. In an electric egg-candling apparatus, the combination of a support for an egg, photo-electric means for measuring the light-transmitting capacity of an egg, a shutter comprising a pair of pivoted plates vertically spaced from said support, an actuating member secured to each of said plates and extending toward said support whereby said members will normally be contacted by an egg seated on said support, so that said shutter may be opened to an extent varying in accordance with the size of the egg, and electrical means actuated by said shutter for giving a plurality of different signals according to the size of the egg to be tested.

14. In an electric egg-candling apparatus, the combination of a support for an egg, photo-electric means for measuring the light-transmitting capacity of an egg, a shutter comprising a pair of pivoted plates vertically spaced from said support, an actuating member secured to each of said plates and extending toward said support whereby said members will normally be contacted by an egg seated on said support, so that said shutter may be opened to an extent varying in accordance with the size of the egg, and a diaphragm mounted adjacent said shutter adapted to increase the positive or negative variation in transmitted light beyond an amount proportional to a variation in the size of the opening of said shutter.

15. In an electric egg-candling apparatus, the combination of a support for an egg, photo-electric means for measuring the light-transmitting capacity of an egg, a shutter comprising a pair of pivoted plates vertically spaced from said support, an actuating member secured to each of said plates and extending toward said support whereby said members will normally be contacted by an egg seated on said support, so that said shutter may be opened to an extent varying in accordance with the size of the egg, electrical means actuated by said shutter for giving a plurality of different signals according to the size of the egg to be tested, and a diaphragm mounted adjacent said shutter adapted to increase the positive or negative variation in transmitted light beyond an amount proportional to a variation in the size of the opening of said shutter.

RAYMOND R. HAUGH.